United States Patent
Visconti et al.

(10) Patent No.: US 8,412,410 B2
(45) Date of Patent: Apr. 2, 2013

(54) FEEDBACK CONTROL METHOD AND UNIT OF A SERVO CONTROLLED SYSTEM WHICH AFFECTS THE PSYCHOPHYSICAL STATE OF A USER

(75) Inventors: Amedeo Visconti, Turin (IT); Antonio Calvosa, Milan (IT)

(73) Assignee: Ferrari S.p.A., Modena (IT)

( * ) Notice: Subject to any disclaimer, the term of this patent is extended or adjusted under 35 U.S.C. 154(b) by 798 days.

(21) Appl. No.: 12/522,206

(22) PCT Filed: Jan. 3, 2008

(86) PCT No.: PCT/IB2008/000010
§ 371 (c)(1),
(2), (4) Date: Nov. 25, 2009

(87) PCT Pub. No.: WO2008/084370
PCT Pub. Date: Jul. 17, 2008

(65) Prior Publication Data
US 2010/0106365 A1    Apr. 29, 2010

(30) Foreign Application Priority Data
Jan. 4, 2007    (IT) .............................. BO2007A0002

(51) Int. Cl.
G06F 7/00    (2006.01)
G06F 17/00    (2006.01)
B60R 15/00    (2006.01)
E05F 15/00    (2006.01)
G05D 1/00    (2006.01)
G05D 3/00    (2006.01)

(52) U.S. Cl. .......................................... 701/36; 701/49

(58) Field of Classification Search .................... 701/36, 701/49
See application file for complete search history.

(56) References Cited

U.S. PATENT DOCUMENTS

| 5,187,943 | A | 2/1993 | Taniguchi et al. |
| 6,079,485 | A * | 6/2000 | Esaki et al. ..................... 165/43 |
| 6,202,934 | B1 | 3/2001 | Kamiya et al. |
| 6,397,615 | B1 * | 6/2002 | Kawai et al. .................... 62/244 |
| 6,481,222 | B1 * | 11/2002 | Denniston ........................ 62/94 |
| 2006/0235753 | A1 | 10/2006 | Kameyama |
| 2008/0195564 | A1 * | 8/2008 | Kojima et al. .................. 706/12 |
| 2009/0031741 | A1 * | 2/2009 | Hara et al. ...................... 62/239 |

OTHER PUBLICATIONS

International Search Report, based on International Application Serial No. PCT/IB2008/000010, European Patent Office, Jun. 12, 2008.

* cited by examiner

Primary Examiner — Thomas Tarcza
Assistant Examiner — Imran Mustafa
(74) Attorney, Agent, or Firm — Bryan A. Santarelli; Graybeal Jackson LLP

(57) ABSTRACT

An embodiment of a feedback control method and unit of a servo controlled system which acts on the environment surrounding a user for adjusting at least one feature of the environment which affects the psychophysical state of the user; the control unit has: a memory device in which there is stored a desired optimal value or a range of desired optimal values of a psychophysical feedback parameter of the user correlated with the perception that the user has of the feature of the environment adjusted by the servo controlled system; an estimation device for cyclically estimating a real value of the psychophysical feedback parameter of the user by means of at least one measurement performed directly on the user; and a driving device for cyclically driving the servo controlled system for seeking the optimal desired value of the psychophysical feedback parameter.

21 Claims, 1 Drawing Sheet

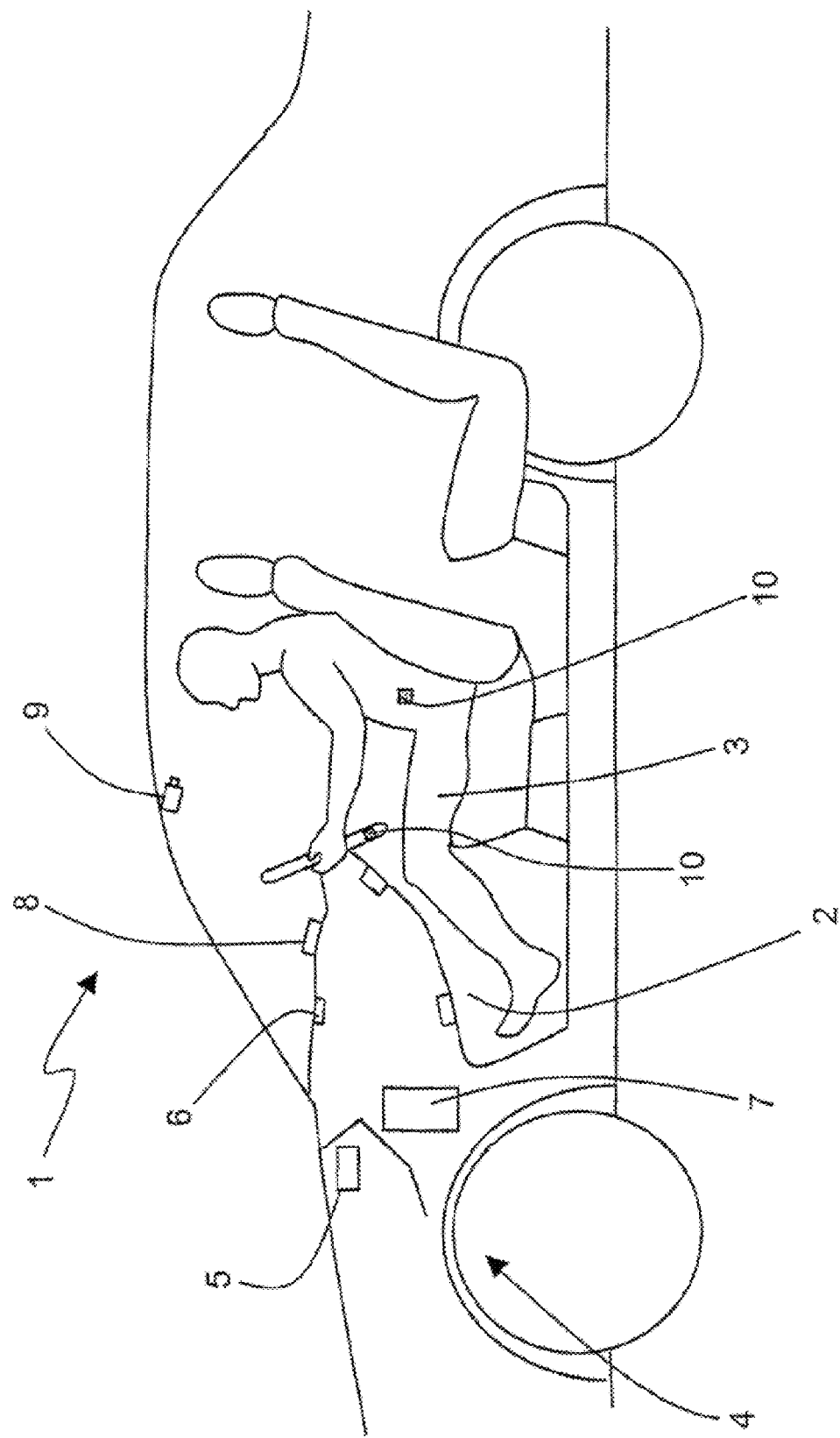

FEEDBACK CONTROL METHOD AND UNIT OF A SERVO CONTROLLED SYSTEM WHICH AFFECTS THE PSYCHOPHYSICAL STATE OF A USER

PRIORITY CLAIM

The present application is a United States national phase application filed pursuant to 35 USC §371 of International Patent Application Serial No.: PCT/IB2008/000010, filed Jan. 3, 2008; which application claims priority to Italian Patent Application Serial No.: BO2007A000002, filed Jan. 4, 2007; which foregoing applications are incorporated herein by reference in their entireties.

TECHNICAL FIELD

An embodiment of the present invention relates to a feedback control method and unit which affects the psychophysical state of a user.

An embodiment of the present invention is advantageously applied to a car, to which explicit reference will be made in the following description without loosing in generality.

BACKGROUND

Servo controlled systems which affect the psychophysical state of passengers are increasingly employed in modern, top range cars; the most common among such servo controlled systems is the climate control system, which is capable of automatically operating for guaranteeing the temperature required by the passengers inside the passenger compartment. Another example of such servo controlled systems is the internal rear-view mirror provided with an anti-dazzle function to automatically reduce the amount of reflected light in case of strong rear light. A further example of such servo controlled systems is the servo controlled adjustment of the position, the configuration, or the temperature of seats.

Normally, a servo controlled system in a car has a control device, by means of which the user (i.e., the driver or a passenger) sends his or her needs to the servo controlled system itself (e.g., the desired temperature in case of the climate control system); subsequently, the servo controlled system tries to respond to the user's needs either with an open loop control logic (in the case of simpler and/or less sophisticated servo controlled systems) or with a closed loop or feedback control logic (in the case of more complex and/or more sophisticated servo controlled systems).

In the case of a closed loop or feedback control logic, at least one measurable physical feedback quantity is identified, which is either directly or indirectly correlatable with a need expressed by the user (e.g., the temperature inside the passenger compartment and/or the humidity inside the passenger compartment in the case of the climate control system). In use, according to the need expressed by the user, a desired optimal value of the physical feedback quantity (either fixed or variable in time) is determined and the servo controlled system is driven to seek such desired optimal value; i.e., the servo controlled system is driven so that the real measured value of the physical feedback quantity is equal to the desired optimal value.

A major limitation of the above-described closed loop or feedback control logic is that often the user is not able to correctly express his or her needs and thus the servo controlled system determines and seeks a desired optimal value which actually does not correspond to the user's real but poorly expressed needs. In a practical example applied to the climate control system, the user's real need is to feel comfortable, i.e., not to perceive any discomfort (heat, cold, excessive humidity, excessively dry air, stale air, unpleasant odors) deriving from the climate inside the passenger compartment, but often he or she is able to correctly express this need only in very vague terms (e.g., I'm hot, I'm cold, I am not comfortable) and is hardly ever able to correctly translate such a need into a numeric value of a physical feedback quantity (i.e., how many temperature degrees and what percentage of humidity).

Furthermore, in the case of a complex servo controlled system, i.e., provided with several servo controls, it is possible to perform various actions which are reciprocally coordinated in order to obtain a final effect targeted to an average user who could be very different from the actual user. For example, in the case of a climate control system, it is possible to adjust the air temperature, to adjust the air humidity, to adjust the air introduction flow rate, to adjust the number and position of the air outlet vents and to adjust the percentage of air recirculation; in summer, an average user may find a flow of cool air directed towards his or her legs beneficial, but the actual user may suffer from arthrosis and thus be unable to stand such a flow of cool air directed towards his or her legs.

U.S. Pat. No. 5,187,943A1, which is incorporated by reference, discloses a control apparatus for an air-conditioner of a vehicle; the temperature and the velocity of air blown from an air-conditioner are controlled in such a manner that a temperature sensation value expressed by a mathematical formula becomes a targeted temperature sensation value by using facial skin temperature and a rate of change in the facial skin temperature.

U.S. Pat. No. 6,202,934B1, which is incorporated by reference, discloses an air conditioner for a vehicle which accurately estimates a thermal load to enhance inside temperature controllability. The air conditioner comprises a first surface temperature sensor for detecting a temperature of an internal surface region of a vehicle compartment which varies with a temperature of an external surface of a vehicle, and a second surface temperature sensor for detecting a temperature of a surface region which varies with an intensity of solar radiation intruding into the vehicle compartment.

SUMMARY

An embodiment of the present invention provides a feedback control method and unit of a servo controlled system which affects the psychophysical state of a user, such a servo controlled method and system being free from the above-described drawbacks and being, at the same time, simple and cost-effective to implement.

BRIEF DESCRIPTION OF THE DRAWINGS

One or more embodiments of the present invention will now be described with reference to the accompanying drawing which illustrates a non-limitative example thereof; specifically, the accompanying drawing FIG. 1 shows a diagrammatic view of the passenger compartment of a car provided with a control unit according to an embodiment of the present invention.

DETAILED DESCRIPTION

In FIG. 1, numeral/indicates an embodiment of a road vehicle, specifically a car, provided with a passenger compartment 2 which accommodates a user 3 (specifically a driver or a passenger). The passenger compartment 2 is provided with a servo controlled climate control system 4 which adjusts the climate inside the passenger compartment 2; specifically, the climate control system 4 is capable of modifying the temperature and/or humidity inside the passenger compartment 2 to try to maximize the well being of the user 3.

The climate control system 4 comprises a servo controlled air treatment unit 5 adapted to treat (heat, cool, dehumidify and/or filter) the air which is to be introduced into the passenger compartment 2. A plurality of air vents 6 are connected to the air treatment unit 5, which have the function of introducing the air treated by the air treatment unit 5 into the passenger compartment 2, are distributed inside the passenger compartment 2, and are arranged at different levels in order to be able to introduce the air into different areas of the passenger compartment 2 itself. The air treatment unit 5 may perform many servo controlled actions to affect the climate of the passenger compartment 2; for example, the treatment unit 5 may adjust the air temperature, may adjust the air humidity, may adjust the air introduction flow rate, may adjust the number and the position of the air outlet vents, and may adjust the air recirculation percentage.

Furthermore, the climate control system 4, comprises a feedback control unit 7, which feedback drives the air treatment unit 5 to try to maximize the well being of the user 3. The control unit 7 comprises an interface 8 by means of which the user 3 communicates his or her requests concerning the climate control inside the passenger compartment 2 to the control unit 7 (normally, the user 3 sets the desired temperature by means of the interface 8).

At least one physical environmental feedback magnitude related to the environment which surrounds the user 3 is identified during the step of designing the control unit 7; for example, such physical environmental feedback magnitude may be the temperature and, possibly, the air humidity. In use, according to the requests formulated by the user 3 through the interface 8, the control unit 7 determines a desired optimal value or range of desired optimal values of temperature and/or humidity (i.e., of the physical environmental feedback magnitude); subsequently, the control unit 7 cyclically measures a value of temperature and/or humidity (i.e., of the physical environmental feedback magnitude) by means of a measurement made inside the passenger compartment 2 and cyclically drives the air treatment unit 5 of the climate control system 4 to seek the desired optimal value of the physical environmental feedback quantity.

At least one psychophysical feedback parameter of the user 3 correlated with the perception that the user 3 has of the temperature and/or humidity (i.e., of the feature of the environment adjusted by the climate control system 4) is identified during the step of designing the control unit 7; furthermore, a desired optimal value or range of desired optimal values of the psychophysical feedback parameter is determined during the step of designing the control unit 7. In use, the control unit 7 cyclically estimates a real value of the psychophysical feedback parameter of the user 3 by means of at least one measurement directly performed on the user 3 and thus cyclically drives the air treatment unit 5 of the climate control system 4 to seek the desired optimal value of the psychophysical feedback parameter.

Consequently, the control unit 7 comprises: a memory device in which a desired optimal value or range of desired optimal values of the psychophysical feedback parameter is stored, an estimation device for cyclically estimating a real value of the psychophysical feedback parameter by means of at least one measurement directly made on the user 3, and a driving device for cyclically driving the servo controlled system 4 for seeking the desired optimal value of the psychophysical feedback parameter.

It is worth noting that the control unit 7 may operate either by using only the control loop based on the temperature and/or humidity (i.e., on the physical environmental feedback quantity), or by using only the control loop based on the psychophysical feedback parameter. However, according to an embodiment, the control unit 7 works by using both the control loop based on the temperature and/or humidity (i.e., on the physical environmental feedback quantity), and the control loop based on the psychophysical feedback parameter; in other words, the control unit 7 cyclically drives the air treatment unit 5 of the climate control system 4 to seek both the desired optimal value of the psychophysical feedback parameter, and the desired optimal value of the temperature and/or humidity (i.e., of the physical environmental feedback quantity). In this manner, the control unit 7 takes into account both the needs explicitly expressed by the user 3 by means of the control interface 7, and the perception (e.g., conscious or unconscious) that the body of the user 3 manifests with respect to the climate inside the passenger compartment 2; this prevents a poor choice made by the user 3 or an incorrect interpretation of the signals emitted by the body of the user 3 from excessively conditioning the well being of the user 3 himself or herself.

In order to coordinate the interventions of both control loops, various strategies are possible for managing the cases of conflict, i.e., the cases in which the two control loops request interventions of the opposite type by the air treatment unit 5 of the climate control system 4 (e.g., the control loop based on the temperature and/or humidity may request a temperature increase, while the control loop based on the psychophysical feedback parameter may request a temperature decrease). A possible solution is to maintain the difference between the desired optimal value and the real measured value of temperature and/or humidity (i.e., of the physical environmental feedback quantity) lower than a predetermined threshold, regardless of the difference existing between the desired optimal value and the estimated value of the psychophysical feedback parameter; in other words, the control loop based on the psychophysical feedback parameter is allowed to correct the action of the control loop based on the temperature and/or humidity (i.e., on the physical environmental feedback quantity) within a predetermined margin.

According to a possible embodiment, in order to seek the desired optimal value of the psychophysical feedback parameter, the control loop based on the psychophysical feedback parameter modifies at least one first driving variable of the climate control system 4 and thus verifies whether the difference existing between the desired optimal value and the estimated value of the psychophysical feedback parameter displays significant variations after modifying the first driving variable. If the difference existing between the desired optimal value and the estimated value of the psychophysical feedback parameter does not display any significant variation after modifying the first driving variable, then a further more incisive modification is performed on the first driving variable; alternatively, if the difference existing between the desired optimal value and the estimated value of the psychophysical feedback parameter does not display any significant variation after modifying the first driving variable, then a second driving variable of the servo controlled system is modified.

According to a possible embodiment, the psychophysical feedback parameter is the state of perspiration of the user 3, which may be optically determined by means of a camera 9 which films the face of the user 3, or may be determined by means of at least one sensor 10 which detects the humidity of the skin of the user 3; such sensor 10 could measure the surface conductivity of the skin of the user 3 and could be inserted into a steering wheel of the vehicle/or into an item of clothing worn by the user 3.

According to a different embodiment, the psychophysical feedback parameter is the body temperature of the user 3 and, specifically, the external body temperature of the user 3 measured on the skin of the user 3 him or herself. The external body temperature of the user could be measured by detecting the infrared radiation of the user 3 by means of an infrared sensitive camera 10 which performs a thermography, or could be measured by means of a sensor 10 inserted into a steering wheel of the vehicle/or into an item of clothing worn by the user 3.

According to a further embodiment, the psychophysical feedback parameter is the heart beat frequency of the user 3 which may be measured by means of a sensor 10 inserted into a steering wheel of the vehicle/or into an item of clothing worn by the user 3.

It is worth noting that the above-described psychophysical feedback parameters are only some examples and thus further psychophysical feedback parameters not suggested in this description may be used. Furthermore, the best results are obtained when the psychophysical feedback parameter is not provided by a single measurement (e.g., the perspiration state or the external body temperature only), but is provided by a synthesis of several measurements so as to provide a better overview of the real psychophysical state of the user 3. In other words, the real value of the psychophysical feedback parameter is obtained by appropriately combining (e.g., averaging) the results of several measurements performed on the user 3.

According to a possible embodiment, the control unit 7 also determines the context (e.g., driving in city traffic, relaxed driving on freeways or highways, sporty driving on freeways or highways, sporty driving on a racing track) in which the vehicle 1 is driven and the cyclical estimate of the real value of the psychophysical feedback parameter is weighed according to the context in which the vehicle/is driven. In other words, it has been noted that the context in which the vehicle/is driven may have considerable influences on the psychophysical state of the user 3. For example, a situation of minor stress (increase of external temperature and/or heart beats) is normal when driving in city traffic, but should not be present in the case of relaxed driving on freeways or highways; furthermore, a situation of stress is normal immediately after an emergency maneuver (e.g., a very sudden braking during relaxed driving on freeways), or in case of prolonged queuing on a highway, or a state of extreme alertness is normal in case of sporty driving on racing track but is not normal in case of relaxed driving on freeways or highways. In other words, knowing the context in which the vehicle/is driven allows a monitory system to more correctly evaluate the result of the measurements performed on the user 3.

The context in which the vehicle/is driven may be determined according to the time trend of the performances of the vehicle/and/or of the position of the vehicle 1, the performances and/or position being detected by the control unit 7. In other words, knowing the position of the vehicle/(in a city, on a freeway, on a highway, on a racing track, etc.) and its performances (slow driving, fast driving, race driving, queuing, etc.), it may be possible to accurately determine the context in which the vehicle/itself is driven; by way of example, a very sudden braking followed by a prolonged stop of the vehicle/is a clear sign of an emergency situation which is very likely to determine a considerable stress on the user 3.

From the foregoing description, it is apparent that according to an embodiment of the present invention, a servo controlled system 4 which acts on the environment surrounding a user 3 is feedback controlled to adjust at least one feature of the environment which affects the psychophysical state of the user 3; an embodiment of the feedback control includes the steps of:

identifying, during a step of designing, at least one psychophysical feedback parameter of the user 3 correlated with the perception that the user 3 has of the environment feature adjusted by the servo controlled system 4;

determining, during a step of designing, a desired optimal value or a range of desired optimal values of the psychophysical feedback parameter;

cyclically estimating a real value of the psychophysical feedback parameter of the user 3 by means of at least one measurement performed directly on the user 3; and cyclically driving the servo controlled system 4 for seeking the desired optimal value of the psychophysical feedback parameter.

According to the embodiment shown in the accompanying figures, the servo controlled system 4 is the climate control system 4 of the passenger compartment 2 of the vehicle 1.

According to a different embodiment (not shown), the servo controlled system is a seating system which adjusts the position and/or configuration of a seat which accommodates the user 3; in this case, the psychophysical feedback parameter could be correlated with the stiffening of the postural muscles of the user 3 and could be measured by means of an electromyogram.

According to a further embodiment (not shown), the servo controlled system is a noise reduction and/or suppression system; in this case, the psychophysical feedback parameter is correlated with the perception of the noise by the user 3.

According to further embodiments, the servo controlled system is removed from the automotive context and could be applied, for example, to the climate control of a working environment in which the user operates.

The above-described feedback control method displays many advantages, because it is simple and cost-effective to implement and at the same time allows the adjusting of the features of the environment which surrounds the user 3 by accurately following the body sensations of the user 3 himself or herself; in other words, the above-described feedback control method does not use an unreal, average user who could be very different from the actually present user 3, but seeks the psychophysical wellbeing of the user 3 by directly detecting the body sensations of the user 3 himself or herself.

The invention claimed is:

1. A feedback control method of a servo controlled system which acts on the environment surrounding a user for adjusting at least one feature of the environment which affects the psychophysical state of the user; the method comprising the steps of:

identifying at least one psychophysical feedback parameter of the user correlated with the perception that the user has of the environment feature adjusted by the servo controlled system;

determining a desired optimal value or a range of desired optimal values of the psychophysical feedback parameter;

cyclically estimating a real value of the psychophysical feedback parameter of the user by means of at least one measurement performed directly on the user; and identifying at least one physical environmental feedback quantity related to the environment which surrounds the user;

determining a desired optimal value or a range of desired optimal values of the physical environmental feedback quantity;

cyclically measuring a value of the physical environmental feedback quantity by means of a measurement performed in the environment; and cyclically driving the servo controlled system to seek both the desired optimal value of the psychophysical feedback parameter and the desired optimal value of the physical environmental feedback quantity using a first control loop, which is based on the physical environmental feedback quantity, and a second control loop, which is based on the psychophysical feedback parameter and corrects the action of the first control loop within a predetermined margin.

2. A method according to claim 1, wherein the psychophysical feedback parameter is provided by a synthesis of several measurements performed on the user.

3. A method according to claim 1, wherein the step of cyclically driving the servo controlled system includes maintaining the difference between the desired optimal value and the real measured value of the physical environmental feedback quantity lower than a predetermined threshold regardless of the difference existing between the desired optimal value and the estimated value of the psychophysical feedback parameter.

4. A method according to claim 1, wherein the step of cyclically driving the servo controlled system comprises the further steps of:
modifying at least one first driving variable of the servo controlled system; and
verifying if the difference existing between the desired optimal value and the estimated value of the psychophysical feedback parameter displays significant variations after modifying the first driving variable.

5. A method according to claim 4, wherein if the difference existing between the desired optimal value and the estimated value of the psychophysical feedback parameter does not display any significant variation after modifying the first driving variable, then a further more incisive modification is performed on the first driving variable.

6. A method according to claim 4, wherein if the difference existing between the desired optimal value and the estimated value of the psychophysical feedback parameter does not display any significant variation after modifying the first driving variable, then a second driving variable of the servo controlled system is modified.

7. A method according to claim 1, wherein the servo controlled system is a climate control system which adjusts the temperature and/or humidity in the environment surrounding the user.

8. A method according to claim 7, wherein the psychophysical feedback parameter is the perspiration state of the user.

9. A method according to claim 7, wherein the psychophysical feedback parameter is the body temperature of the user.

10. A method according to claim 9, wherein the psychophysical feedback parameter is the external body temperature of the user measured on the skin of the user him or herself.

11. A method according to claim 10, wherein the external body temperature of the user is measured by detecting the infrared radiation of the user by means of an infrared sensitive camera which performs a thermography.

12. A method according to claim 7, wherein the psychophysical feedback parameter is the heart beat frequency of the user.

13. A method according to claim 1, wherein the servo controlled system is a seating system which adjusts the position and/or configuration of a seat which accommodates the user.

14. A method according to claim 13, wherein the psychophysical feedback parameter is correlated with the stiffening of the postural muscles of the user.

15. A method according to claim 14, wherein the psychophysical feedback parameter is measured by means of an electromyogram.

16. A method according to claim 1, wherein the servo controlled system is a noise reduction and/or suppression system; and
the psychophysical feedback parameter is correlated with the perception of noise by the user.

17. A method according to claim 1, wherein the user is a passenger of a vehicle and the environment which surrounds the user is the passenger compartment of the vehicle.

18. A method according to claim 17, and comprising the further steps of:
determining the context in which the vehicle is driven; and
weighing the cyclical estimation of the real value of the psychophysical feedback parameter according to the context in which the vehicle is driven.

19. A method according to claim 18, and comprising the further step of detecting the time trend of the performances of the vehicle and/or of the position of the vehicle; the context in which the vehicle is driven is determined according to the time trend of the performances of the vehicle and/or of the position of the vehicle.

20. A method according to claim 1, wherein the real value of the psychophysical feedback parameter of the user is estimated by means of at least one sensor inserted into an item of clothing worn by the user him or herself.

21. A feedback control unit of a servo controlled system which acts on the environment surrounding a user for adjusting at least one feature of the environment which affects the psychophysical state of the user, the control unit comprising:
a memory device in which there is stored a desired optimal value or a range of desired optimal values of a psychophysical feedback parameter of the user correlated with the perception that the user has of the feature of the environment adjusted by the servo controlled system;
an estimation device for cyclically estimating a real value of the psychophysical feedback parameter of the user by means of at least one measurement directly performed on the user; and
a driving device for cyclically driving the servo controlled system for seeking the desired optimal value of the psychophysical feedback parameter;
the control unit operable:
to identify at least one physical environmental feedback quantity related to the environment which surrounds the user;
to determine a desired optimal value or a range of desired optimal values of the physical environmental feedback quantity;
to cyclically measure a value of the physical environmental feedback quantity by means of a measurement performed in the environment; and to cyclically drive the servo controlled system to seek both the desired optimal value of the psychophysical feedback parameter and the desired optimal value of the physical environmental feedback quantity using a first control loop, which is based on the physical environmental feedback quantity, and a second control loop, which is based on the psychophysical feedback parameter and corrects the action of the first control loop within a predetermined margin.

* * * * *